SILICON CARBIDE SEMICONDUCTOR DEVICE
Filed July 31, 1959
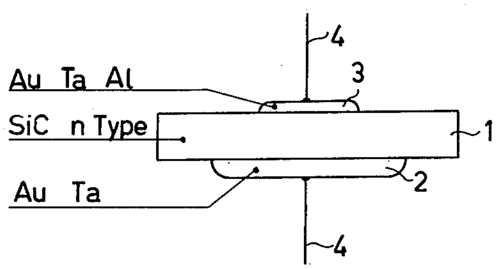
INVENTOR
WILHELMUS F. KNIPPENBERG
HUBERT J. VAN DAAL
ALBERT HUIZING
BY
AGENT United States Patent Office 3,047,439

Patented July 31, 1962

3,047,439

SILICON CARBIDE SEMICONDUCTOR DEVICE

Hubert Jan Van Daal, Wilhelmus Franciscus Knippenberg, and Albert Huizing, Eindhoven, Netherlands, assignors to North American Philips Company Inc., New York, N.Y., a corporation of Delaware Filed July 31, 1959, Ser. No. 830,842
Claims priority, application Netherlands Aug. 27, 1958
12 Claims. (Cl. 148—33)

The invention relates to a semi-conductor device comprising a semi-conductive body of siliconcarbide, on which one or more electrodes are provided. The invention furthermore relates to a method of manufacturing such semi-conductor devices, in which one or more of such electrodes are fused to a semi-conductive body of siliconcarbide and to the electrode material itself for use in these semi-conductor devices and/or this method.

It is known that the semi-conductive compound of siliconcarbide is particularly useful in semi-conductive devices such as crystal rectifiers and transistors required to operate at very high temperatures, for example, of 700° C., owing to their comparatively large energy gap between the valence band and the conduction band. It has also been proposed to use the siliconcarbide in a semi-conductive device known under the name of "pn-radiation source."

With all these uses it is essential that suitable, ohmic and rectifying electrodes should be applicable in a simple, reproducible manner to siliconcarbide, which, in this case, is usually a monocrystal. Apart from mechanical requirements, for example with respect to adhesion, also electrical requirements, for example with respect to a low transition resistance in the case of ohmic electrodes and to a satisfactory rectification factor in the case of rectifying electrodes, are to be fulfilled by these electrodes. In the manufatcure of semi-conductive devices of germanium or silicon the so-called alloying process is a technique conventionally employed to this end. In this case, a quantity of electrode material containing active impurities, for example, of the donor- or acceptor-type, is fused to a semi-conductive body, the formed melt of electrode material dissolving a small quantity of the semi-conductor. During cooling, first a thin layer of the semi-conductor with a content of active impurity crystallizes out of the melt and on this layer the remainder of the electrode material, which may still contain a small quantity of semi-conductor, solidifies in the form of a metallic contact. Thus, rigid and electrically controllable electrodes may be obtained on germanium and silicon.

It appears, however, that the use of this fusing technique in the manufacture of semi-conductive devices of siliconcarbide encounters many difficulties. It is found to be very difficult to find suitable electrode materials providing a satisfactory adhesion to siliconcarbide. Many of the electrode materials used in the said technique do not adhere to siliconcarbide. It appears, in addition, that the control of the electrical properties of the electrodes by means of doping of the electrode material is much more difficult.

The invention has for its object to provide electrode materials, on the basis of which mechanically rigid electrodes can be obtained on siliconcarbide by fusion, while the electrical properties may, if desired, be controlled in a simple reproducible manner by doping with active impurities. A further object of the invention is, inter alia to provide a method by which these electrode materials can be fused to siliconcarbide in a simple reproducible manner.

In a semi-conductor device comprising a semi-conductive body of siliconcarbide, on which one or more electrodes are arranged, at least one of these electrodes is formed, in accordance with the invention, by an electrode fused to the body and containing an alloy of gold with one or more of the high-melting-point transition elements. The high-melting-point transition elements are to be understood to mean, as usual, the metals molybdenum, tungsten, tantalum, titanium, niobium, vanadium, zirconium and hafnium. Whereas gold alone does not adhere to siliconcarbide and the high-melting-point transition elements themselves, owing to their high melting point detracting from the properties of the siliconcarbide, the doping of active impurities via the melt of these elements being much more difficult, are practically not suitable for use as electrode materials, satisfactory results are obtained by electrode materials containing an alloy of gold and the high-melting-point transition elements. Particularly satisfactory results have been obtained by electrode material or by a fused electrode containing an alloy of gold and tantalum. Good results have also been obtained with a fused electrode containing a gold-niobium alloy. The electrode material or the fused electrode consists, preferably, at least mainly of the said alloys, since in this case, the favourable properties of these alloys, particularly those of gold with tantalum, become manifest in the electrode to the most satisfying extent. Owing to its satisfactory mechanical and electrical properties, an electrode material on the basis of a gold-tantalum alloy is preferably employed. However, as an alternative, without an appreciable harmful effect on, for example, the adhesion of the electrode material, particularly of a gold-tantalum alloy, other constitutents may be added to the said alloy, which constituents may be desired from another aspect, for example with respect to the electrical properties. It is also possible, for example, to add constituents such as silicon, while yet the extremely satisfactory properties of the gold-tantalum alloy are maintained. As a further alternative, the tantalum of a gold-tantalum alloy may be replaced partly by other transition elements, for example, even up to 50 at. percent by niobium, while very satisfactorily adhering, electrically advantageous electrodes are yet obtained.

The said alloys contain preferably at least 0.1 at. percent of one or more of the refractory transition elements. This applies, in particular, to an electrode material on the basis of a gold-tantalum alloy; in this case adhesion is already obtained upwards of 0.1 at. percent. According as the atomic percentage of transition elements, particularly of tantalum, is higher, the better becomes the adhesion. Between 0.1 at. percent and 3 at. percent of tantalum the adhesion is even very good. Upwards of 3 at. percent of tantalum the gold-tantalum alloy or an electrode material on the basis of gold-tantalum, to which may have been added, for example, active impurities, are found to flow out perfectly over the siliconcarbide and to provide excellent adhesion. Thus, surface electrodes can be obtained in a simple manner. If an electrode with a special surface is to be applied, use may be made of an electrode material on the basis of a gold-tantalum alloy with a tantalum content of more than 3 at. percent, the surface being confined by means of a jig. However, in such a case use is made of a gold-tantalum alloy-containing electrode material with less than 3 at. percent of tantalum, since this electrode material does substantially not flow out and does not pass beyond the boundaries of the siliconcarbide which it covers prior to the fusing process, while from a mechanical and an electrical point of view it is advantageous to the same extent. It is then possible, for example, to arrange a thin foil of the desired surface on the siliconcarbide; then the alloy electrode remains substantially restricted to the surface and the shape of the foil. An electrode material on the basis of a gold-tantalum alloy has the further advantage that it is comparatively soft, and can be machined in a simple manner. When using thin foils, surface electrodes having small penetration depth may be obtained. The aforesaid properties of electrode material on the basis of a gold-tantalum alloy are also found with the electrode materials on the basis of an alloy of gold with the other refractory transition elements; they are, however, not manifest to the same extent as with gold-tantalum, which is to be preferred for the electrode material owing to its particularly satisfying properties. The atomic percentage of one or more of the transition elements in the said alloys particularly in a gold-tantalum alloy is preferably less than 60 at. percent, since otherwise the melting temperature of the alloy is too high and exceeds 1600° C., so that during the fusing process the properties of the siliconcarbide body could be harmfully affected. As a rule, the melting temperature lies between 1200° C. and 1500° C., whereas at 60 at. percent the melting temperature rises to about 1600° C. It should be noted in this respect that the said atomic percentages or those referred to hereinafter for one or more of the transition elements are calculated on the basis of the total quantity of electrode material inclusive of further neutral constituents or active impurities, i.e. on the basis of the total quantity of electrode material applied prior to the fusing process. In general, the percentages prior to the fusing process differ little from those after the fusing process, although under certain conditions, for example, when one or more volatile constituents are used, appreciable differences may occur owing to evaporation.

The electrode materials on the basis of the said alloys, particularly those of gold and tantalum, are fovourable not only from a mechanical, but also from an electrical point of view. In themselves the alloys of gold and one or more of the transition elements have donor character, so that electrode materials containing at least mainly such alloys can be used for ohmic electrodes on an n-type portion in a semi-conductive device in which the semi-conductive body of siliconcarbide is, at least partly, of the n-type, and for rectifying electrodes on a p-type portion in a semi-conductive device in which the semi-conductive body is, at least partly, of the p-type. Without adversely affecting the low transition resistance for ohmic electrodes and the rectification factor of rectifying electrodes, a quantity of neutral constituents may be added to such an alloy. By suitable doping with active impurities, the electrical properties of the electrodes may be controlled in a simple manner without affecting the mechanical properties. For example, by adding donor impurities, for example, arsenic, bismuth, phosphorus, antimony, the donor character of the electrode and the electrode material may be reinforced, which provides a further improvement in the ohmic properties on an n-type portion and, particularly, in the rectifying properties on a p-type portion in the uses referred to above. By adding an acceptor, for instance boron, indium, gallium or aluminum, the donor character may be reduced and, with an adequate content, be compensated or even overcompensated so that an electrode material with acceptor character is obtained, the satisfactory, mechanical properties being, however, not affected. With a suitable acceptor addition to a semi-conductive device in which the semi-conductive body of siliconcarbide is partly of the p-type, the electrode materials referred to above may be used for ohmic electrodes on a p-type portion and in a semi-conductive device in which the semi-conductive body is at least partly of the n-type, when the acceptor addition does not overcompensate to obtain electrode material of acceptor character, for ohmic electrodes on n-type portions and, in the case of overcompensation to the acceptor character, for rectifying electrodes on n-type portions. As an acceptor aluminum and also indium are particularly suitable. Aluminum is, moreover, found to give rise to flowing out. The doping of the electrodes on siliconcarbide takes place, presumably, by recrystallisation and segregation, as is the case with with germanium and silicon. However, the invention is not bound to this presumption. For instance, also diffusion might play a part.

According to a further aspect of the invention relating to the method of applying electrodes, the fusing process preferably is performed in a pure, inert atmosphere, for example, in pure argon or helium, since, in the event of an excess quantity of impurities in the atmosphere, adhesion may be more difficult. When using the conventional, technical argon, difficulties were sometimes met in the adhesion. A particularly suitable method has appeared to be to fuse the electrode in vacuum, which may be obtained, for example, by reducing the pressure to less than 1 mm., subsequent to rinsing with a pure, inert gas, for instance argon. The pressure is preferably reduced to less than about $10^{-2}$ mm. Hg.

The invention will now be described more fully with reference to a few embodiments, the results of which are summarized in the following table.

*Table*

| Example | Electrode or contact composition | Type of contact produced on SiC crystal of | | Contact adhesion | Remarks |
|---|---|---|---|---|---|
| | | n-Type | p-Type | | |
| 1 | Au | | | No adhesion | |
| 2 | AuTa (0.1) | Ohmic | Rectifying | Adhesion | Adhesion limit. |
| 3 | AuTa (0.5) | do | do | Satisfactory adhesion | |
| 4 | AuTa (1) | do | do | do | |
| 5 | AuTa (3) | do | do | do | Tendency to flow out. |
| 6 | AuTa (10) | do | do | do | Flowing out strongly. |
| 7 | AuTa (40) | do | do | do | Do. |
| 8 | AuTa (60) | do | do | do | High melting point (1,600° C.). |
| 9 | AuNb (10) | do | do | do | |
| 10 | AuW (3) | do | do | do | |
| 11 | AuTa (1) Nb (2) | do | do | do | |
| 12 | AuB (5) | | | No adhesion | |
| 13 | AuAL (7) | | | do | |
| 14 | AuTa (1) B (15) | Ohmic | Rectifying | Satisfactory adhesion | |
| 15 | AuTa (1) Al (3) | do | do | do | Flowing out satisfactorily. |
| 16 | AuTa (1) Al (7) | do | Ohmic | do | High-ohmic on p-type. |
| 17 | AuTa (1) In (1) | do | Rectifying | do | |
| 18 | AuTa (1) B (35) | do | Ohmic | do | |
| 19 | AuTa (1) Al (20) | do | do | do | |
| 20 | AuTa (10) Al (15) | do | do | do | Flowing out strongly. |
| 21 | AuTa (2) In (8) | do | do | do | |
| 22 | AuTa (1) Al (27) | do | do | do | High-ohmic on n-type. |
| 23 | AuTa (1) Al (30) | Rectifying | do | do | |
| 24 | AuTa (2) Si (7) | Ohmic | Rectifying | do | |
| 25 | AuTa (2) Al (10) Si (6) | do | do | do | |
| 26 | AuTa (1) As (3) | do | do | do | High rectification factor. |
| 27 | AuTa (7) As (3) | do | do | do | Flowing out satisfactorily. |
| 28 | AuTa (2) Sb (13) | do | do | do | |
| 29 | AuTa (2) Bi (7) | do | do | do | High rectification factor. |

In the first column of this table is indicated a large number of different compositions of electrode material. The first constituent is always gold and the second constituent belongs to the high-melting-point transition elements, with the exception of three examples of the table, Examples 1, 12 and 13, which relate to compositions of electrode material without a content of high-melting-point transition elements, the poor mechanical properties thereof being indicated in the fourth column. After the second and any further constituents of the electrode material is always indicated in parentheses the content of the constituent concerned in at. percent of the total quantity. The various alloys were produced by melting the constituents together in their proper weights in a quartz or alumina crucible in a very pure atmosphere, obtained by rinsing previously three times with pure argon and then establishing a vacuum by pumping off each time to about $10^{-3}$ mm. Hg. The pure argon contained less than 0.001% of nitrogen, less than 0.003% of water vapour and less than 0.001% of oxygen. By known methods pellets of the alloys were made, the diameter of these pellets being about 0.5 to 1 mm. Prior to the test each time four pellets were used, of which two had the same known standard composition and the other two each had the same composition to be tested. All four pellets were fused onto one side of a siliconcarbide monocrystal plate having a diameter of about 1 cm. and a thickness of about 0.5 mm., in a graphite crucible in a very pure atmosphere, which had previously been rinsed three times with the aforesaid pure argon and pumped off each time to a vacuum of about $10^{-3}$ mm. As will be evident the term "very pure gas atmosphere" is being used to refer to both the pure argon rare gas and a substantially high vacuum. As the electrode of known properties was employed, as a rule, Ni-Mo-B-alloy (Ni 80 at. percent, Mo 10 at. percent, B 10 at. percent) which had been found to be low-ohmic both on n-type and on p-type. Prior to the fusing process the siliconcarbide plate was carefully cleaned, degreased in an acetone solution and, if necessary, saidblasted and ground. The fusing process always took place so that the assembly was heated at a temperature exceeding the melting temperature of the electrode material, this temperature being maintained for about 1 minute. The melting temperatures were, as a rule, between 1200° C. and 1400° C. In order of succession the four pellets as previously described were fused in this manner onto a n-type and a p-type siliconcarbide plate. The siliconcarbide employed had a specific resistance lying between 0.1 and 10 ohm-cm. Comparison tests were carried out on high-ohmic siliconcarbide, which, as a rule, yielded the same results. Columns 2 and 3 indicate the properties of the electrode material concerned found by electrical measurements, on n-type and on p-type siliconcarbide. If not otherwise stated, ohmic is to be understood to mean low-ohmic, i.e. the transition resistance is negligibly low, for example, lower than 0.1 ohm; in this case, the electrode concerned did not appear to exhibit any appreciable voltage-dependence. The expression "rectifying" is to be understood to mean that the rectification factor amounted to between 10 and 1000, or sometimes even more; it should be noted that this factor was, as a rule, higher according as the electrode material on n-type had more acceptor character and on p-type more donor character. It sometimes appeared to be necessary to sandblast the crystal plate to remove surface layers deposited on the plate during the alloying process. By using a suitable etching agent, for example, a concentrated $HNO_3$ and/or $KClO_3$ solution, the rectification factor could, in general, be improved. In the fourth column are indicated the mechanical properties of the electrode. "Satisfactory adhesion" is to be understood to mean that the electrode material can be broken from the siliconcarbide only by removing siliconcarbide at the same time. In the last column any further factors are indicated.

Apart from the experiments indicated in the table, experiments with thin foils, for example of a thickness of 10/μ were carried out; these foils could be fused to the siliconcarbide to form local contacts in accordance with the shape of the foil, as long as the tantalum content was lower than 3 at. percent, for example 2 at. percent.

The electrode materials referred to above in accordance with the invention may be used in many kinds of semi-conductive devices of siliconcarbide. For example, a suitable crystal rectifier may be obtained by fusing for example onto a monocrystal plate of given conductivity type, in opposite positions, a rectifying and an ohmic electrode, of which at least one is made of an electrode material according to the invention.

This is illustrated in the sole figure in the accompanying drawing, which is a schematic end view of a suitable rectifying structure. Referring specifically to the drawing, there is shown therein a monocrystalline siliconcarbide wafer 1 having a diameter of about 1 cm. and a thickness of about 0.5 mm. The crystal had n-type conductivity with a resistivity of about 1 ohm-cm. On opposite sides of the wafer 1 were simultaneously fused a gold tantalum alloy pellet 2 containing 10 at. percent of tantalum and a gold-tantalum-aluminum pellet 3, containing about 5 at. percent of tantalum and about 3 at. percent of aluminum, by heating the whole at about 1500° C. in vacuum. Nickel leads 4 may be soldered to the exposed contacts and then the wafer 1 may be etched briefly in $NHO_3$ to clean its surfaces. The pellet 2 establishes an ohmic connection to the wafer 1, and the pellet 3 a rectifying connection to the wafer 1.

A further suitable possibility of manufacturing a semiconductive device with a pn-transition resides in that onto a monocrystal siliconcarbide plate, in which a pn-junction is obtained during its growth, ohmic electrodes, of which at least one is obtained in accordance with the invention, are fused onto the p-portion and the n-portion. It will be obvious that the fused electrodes and the electrode materials according to the invention may be employed in many ways in a semi-conductive device with a semi-conductive body of siliconcarbide. In general it is to be preferred to apply the constituents concerned of the electrode material in their homogeneous alloyed state to the siliconcarbide and to fuse them thereto in the said state. As an alternative, however, the constituents may be added separately prior to or during the fusing process, the alloy being formed, in this case, during the fusing process.

Electrode materials according to the invention, particularly those on the basis of a gold-tantalum alloy, are also quite suitable for use in electrodes constituting at the same time a connection between a supporting body or support and the siliconcarbide body of the semi-conductive device. With crystal rectifiers, for example, it is desired for the ohmic electrode, for example, to be fused onto a supporting body of, for example, copper, iron, molybdenum, tungsten or tantalum. Also to this end are very suitable the electrode materials according to the invention, for example, the gold-tantalum alloy with a tantalum content of more than 3 at. percent, having a high degree of flow. Suitable materials for the supporting body are, for example, iron-nickel-cobalt alloys, such as an alloy of 54% by weight of Fe, 28% by weight of Ni and 18% by weight of Co. Although in the foregoing reference is usually made to the use of monocrystalline siliconcarbide, use may, of course, be made with advantage of the electrode materials in semi-conductive devices having a polycrystalline siliconcarbide body.

What is claimed is:

1. A semiconductor device comprising a semiconductive body of silicon carbide containing a surface region of n-type conductivity, and a fused mass alloyed and adherent to the said surface region and constituting an ohmic connection thereto, said mass comprising essentially an alloy of gold and between 0.1 and 60 at. percent of a high-melting-point transition element selected from the group consisting of molybdenum, tungsten, tantalum, titanium, niobium, vanadium, zirconium, and hafnium.

2. A semiconductor device comprising a semiconductive body of silicon carbide containing a surface region of n-type conductivity, and a fused mass alloyed and adherent to the said surface region and constituting a rectifying connection thereto, said mass comprising essentially an alloy of gold and between 0.1 and 60 at. percent of a high-melting-point transition element selected from the group consisting of molybdenum, tungsten, tantalum, titanium, niobium, vanadium, zirconium, and hafnium.

3. A semiconductor device comprising a semiconductive body of silicon carbide containing a surface region of p-type conductivity, and a fused mass alloyed and adherent to the said surface region and constituting an ohmic connection thereto, said mass comprising essentially an alloy of gold and between 0.1 and 60 at. percent of a high-melting-point transition element selected from the group consisting of molybdenum, tungsten, tantalum, titanium, niobium, vanadium, zirconium, and hafnium.

4. A semiconductor device comprising a semiconductive body of silicon carbide containing a surface region of p-type conductivity, and a fused mass alloyed and adherent to the said surface region and constituting a rectifying connection thereto, said mass comprising essentially an alloy of gold and between 0.1 and 60 at. percent of a high-melting-point transition element selected from the group consisting of molybdenum, tungsten, tantalum, titanium, niobium, vanadium, zirconium, and hafnium.

5. A semiconductor device comprising a semiconductive body of silicon carbide, and a fused mass bonded to the body, said mass comprising an alloy of gold between 0.1 and 60 at. percent of, tantalum, and up to 50 at. percent of another high-melting-point transition element selected from the group consisting of molybdenum, tungsten, titanium, niobium, vanadium, zirconium, and hafnium 6. A semiconductor device comprising a semiconductive body of silicon carbide, and a fused mass bonded to said body and forming an electrode connection thereto, said mass comprising essentially an alloy of gold and between 0.1 and 60 at. percent of a high-melting-point transition metal selected from the group consisting of molybdenum, tungsten, tantalum, titanium, niobium, vanadium, zirconium, and hafnium.

7. A device as set forth in claim 6 wherein the mass further includes an element selected from the group consisting of donors and acceptors.

8. A device as set forth in claim 6 wherein the silicon carbide body is a single crystal.

9. A semiconductor device comprising a silicon carbide semiconductive body, and a fused mass bonded to said body and forming an electrode connection thereto, said mass comprising essentially an alloy of gold and between 0.1 and 60 at. percent of tantalum.

10. A device as set forth in claim 9 wherein the mass further includes an element selected from the group consisting of acceptors and donors.

11. A device as set forth in claim 9 wherein the mass contains between 0.1 and 3 at. percent of tantalum.

12. A device as set forth in claim 9 wherein the mass contains between 3 and 60 at. percent of tantalum.

References Cited in the file of this patent

UNITED STATES PATENTS

| | | |
|---|---|---|
| 2,831,786 | Moll | Apr. 22, 1958 |
| 2,854,364 | Lely | Sept. 30, 1958 |
| 2,898,528 | Patalong | Aug. 4, 1959 |
| 2,918,396 | Hall | Dec. 22, 1959 |
| 2,937,323 | Kroko | May 17, 1960 |